United States Patent
Neuman et al.

(10) Patent No.: US 8,334,888 B2
(45) Date of Patent: Dec. 18, 2012

(54) DYNAMICALLY GENERATED RING TONES

(75) Inventors: Michael Neuman, San Francisco, CA (US); Brian K. McKnight, San Rafael, CA (US)

(73) Assignee: Apple Inc., Cupertino, CA (US)

( * ) Notice: Subject to any disclaimer, the term of this patent is extended or adjusted under 35 U.S.C. 154(b) by 600 days.

(21) Appl. No.: 12/549,323

(22) Filed: Aug. 27, 2009

(65) Prior Publication Data
US 2011/0051914 A1 Mar. 3, 2011

(51) Int. Cl.
H04N 7/14 (2006.01)
(52) U.S. Cl. .................. 348/14.02; 348/14.01
(58) Field of Classification Search ............... 348/14.01, 348/14.02; 379/201.01, 207.02, 207.16, 379/373.01–373.03, 376.01; 455/414.1, 455/567; 370/352
See application file for complete search history.

(56) References Cited

U.S. PATENT DOCUMENTS

| | | | |
|---|---|---|---|
| 3,038,061 A | 6/1962 | O'Reilly | |
| 4,305,131 A | 12/1981 | Best | |
| 4,538,188 A | 8/1985 | Barker et al. | |
| 4,745,836 A | 5/1988 | Dannenberg | |
| 5,065,345 A | 11/1991 | Knowles et al. | |
| 5,430,495 A | 7/1995 | Ko | |
| 5,521,324 A | 5/1996 | Dannenberg et al. | |
| 5,555,098 A | 9/1996 | Parulski | |
| 5,589,945 A | 12/1996 | Abecassis | |
| 5,676,551 A | 10/1997 | Knight et al. | |
| 5,680,534 A | 10/1997 | Yamato et al. | |
| 5,684,714 A | 11/1997 | Yogeshwar et al. | |
| 5,854,634 A | 12/1998 | Kroitor | |
| 5,872,564 A | 2/1999 | Snibbe et al. | |
| 5,880,788 A | 3/1999 | Bregler | |
| 5,886,710 A | 3/1999 | Snibbe | |
| 5,953,485 A | 9/1999 | Abecassis | |
| 5,999,173 A | 12/1999 | Ubillos | |
| 5,999,185 A | 12/1999 | Kato et al. | |
| 6,067,126 A | 5/2000 | Alexander | |
| 6,184,937 B1 | 2/2001 | Williams et al. | |
| 6,188,830 B1 | 2/2001 | Mercs et al. | |
| 6,204,840 B1 | 3/2001 | Petelycky et al. | |
| 6,320,598 B2 | 11/2001 | Davis et al. | |
| 6,744,974 B2 | 6/2004 | Neuman | |
| 7,565,059 B2 | 7/2009 | Neuman | |
| 2007/0161412 A1 | 7/2007 | Nevid et al. | |
| 2008/0021957 A1 | 1/2008 | Medved et al. | |
| 2008/0152124 A1 | 6/2008 | Ericson | |
| 2009/0067605 A1 | 3/2009 | Holm et al. | |
| 2009/0263100 A1 | 10/2009 | Neuman | |

OTHER PUBLICATIONS

Ritter, Don "Orpheus Interactive Software" http://web.archive.org/web/20010221011850/http://aesthetic-machinery.com/orpheus.html, Feb. 21, 2001, pp. 1-2.

Davis, M., "Media Streams: An Iconic Visual language for Video representation." In: Readings in Human-Computer interaction: Toward the year 2000, ed. Baecker, M. et al., pp. 854-866, 2nd ed. San Francisco, 1995.

Meyer et al., "Creating Motion Graphic with After Effects", CMP Books, pp. 369-371 (2000).

(Continued)

*Primary Examiner* — Tuan Nguyen

(57) ABSTRACT

A first input signal, which has a first playback sequence, is resequenced based upon a characteristic of a second input signal. The resequencing occurs analyzing the characteristic in the second input signal, and modifying the first playback sequence of the first input signal based upon the analysis of the characteristic to generate a second playback sequence. Finally, a third signal is output using the second playback sequence. The third signal can be a rearranged signal or a signal played at a different rate. Using the method, video ringtones can be generated on a mobile device when a call is received.

32 Claims, 6 Drawing Sheets

OTHER PUBLICATIONS

Adobe Systems Incorporated, "Adobe After Effects 4.0: Production Bundle Guide", (95 pages), 1998.

Adobe Systems Incorporated, "Adobe After Effects 4.1 User Guide Supplement", (20 pages), 1999.

Boris FX, "Time and Motion Filters", (1 page) downloaded from http://borisfx.com/products/RED/timemotion.php on Jan. 13, 2005.

Bounce, Bounce Stuff, (2 page) downloaded from http://www.art.net/-hopkins/Don/lang/bounce/bounce.html on Jan. 13, 2005.

Demeyer, T., "IMAGE/INE", (2 pages) downloaded from http://www.giardini.sm/projects/bakxai/trance/immagini.htm on Jan. 13, 2005.

Ritter, D., "ORPHEUS: Interactive Video Software, 1988-1993", (2 pages) downloaded from http://www.aesthetic-machinery.com/Orpheus.html on Jan. 13, 2005.

Moorst, J.V., "Flowmotion 1.0 released", (2 pages) downloaded from http://aulos.calarts.edu/pipermail/lev/2002-February/006614.html on Jan. 13, 2005.

Moorst, J.V., "preANNC: flowmotion live video performance tool", (1 page) downloaded from http://music.calarts.edu/pipermailllev/2001-June/004783.html on Jan. 13, 2005.

Robotfunk, "Robotfunk: Flowmotion 2.5: Features", (2 pages) downloaded from http://www.robotfunk.com/flowmotion/features.html on Jan. 13, 2005.

AVID Technology, Inc., "Softimage Community: Discussion Groups", (1 page) downloaded from http://www.softimage.com/community/xsi/discuss/Archives/ds.archive.9908/msg00061.htm on Jan. 13, 2005.

AIFF Extract, "Jamiroquai 'Supersonic'", (1 page) downloaded from http://216.239.63.104/search?q=cache:z1loqQP_zb8J:homepage.mac.com/post52/bad-a-bing/cv%26info.pdf+5d+%22aiff+extract%22&hl=en&ie=UTF-8%20target=nw on Jan. 13, 2005.

Globalmediapro, Ltd., "Panasonic WJ-MX30 Video Mixer", (3 pages) downloaded from http://www.globalmediapro.com/av/messages/196157.html on Jan. 13, 2005.

O'WONDER, "BiT Bopper 1.6 User's Guide", (3 pages) downloaded from http://216.239.57.104/search?q=cache: LXT5xrQ-NNYJ:Atari.sh.cvut.cz/ftp/pub/mirrors/ftp.uni-giessen.de/grafik/bitbopper.html+bitbopper+alex+blok, updated Nov. 7, 2000.

O'WONDER, "O'WONDER BiT Bopper for Falcon", downloaded from http://www.OWONDER.com/bitbopper/falcon/info/index.html on Jan. 13, 2005, last updated on Oct. 13, 2004.

Bernstein, J., "NATO.0+55+3d Modular: Image Processing", (3 pages) downloaded from http://www.bootsquad.com/nato/nato08.html on Jan. 13, 2005.

Bernstein, J., "NATO.0+55+3d Modular: Media Import/Playback Objects", (2 pages) downloaded from http://www.bootsquad.com/nato/nato04.html on Jan. 13, 2005.

Cycling 74, "MAX/MSP: Overview", (2 pages) downloaded from http://www.cycling74.com/products/maxmsp_2.html on Jan. 13, 2005.

Cycling 74, "MAX/MSP: How Max/MSP Works: A Very Quick Introduction", (2 pages) downloaded from http://www.cycling74.com/products/maxmsp_3.html on Jan. 13, 2005.

Cycling 74, "MAX/MSP: MAX Features; MSP Features", (1 page) downloaded from http://www.cycling74.com/products/maxmsp_4.html on Jan. 13, 2005.

Visualight AG, "VisualJockey R3.5 Software Package Description", (1 page) downloaded from http://www.visualjockey.com/software/software_description.page.php?commercial_id=1 on Jan. 13, 2005.

DYNAMICALLY GENERATED RING TONES

TECHNICAL FIELD

The present technology relates to ringtones. More specifically, the present technology relates to creating an output media signal based upon an input media signal on a mobile device.

INTRODUCTION

The combination of audio and video has become a popular means of entertainment in film, television, video games, computers, PDAs, mobile phones, smart phones, the internet, kiosks, karaoke, ambient environments, and live events. It is extremely desirable to correlate a moving image to a sound track, or vice versa. This technique is demonstrated in film, television, music videos, video games, web sites, cartoons, clubs, events, concerts, light shows, CD-ROMs, art installations, etc.

Current technology requires the user to manually edit a moving picture with a soundtrack, either by editing frames or altering the playback rate of the audio or video. This process requires highly skilled users to work with complex editing tools and understand music structure so as to edit in synchronicity with a sound track. This traditional editing process is both very expensive and time consuming. In fact, one of the more costly and time consuming aspects of professional production of film, video, and multimedia is synchronizing audio and video sources.

Recently this multimedia has found a use on mobile telephones and smart phones wherein a multimedia clip is associated with a contact and is played when a call is received from the contact. However, current technology does not provide for audio and video mixing on a telephone. A contact can only be associated with a multimedia clip that is downloaded to the phone.

With the increasing number of phones capable of capturing video and storing audio it is desirable to be able to mix audio and video in real-time on a phone device. It is additionally desirable to be able create new variations of a multimedia clip when a call is received.

SUMMARY

Additional features and advantages of the concepts disclosed herein are set forth in the description which follows, and in part will be obvious from the description, or may be learned by practice of the described technologies. The features and advantages of the concepts may be realized and obtained by means of the instruments and combinations particularly pointed out in the appended claims. These and other features of the described technologies will become more fully apparent from the following description and appended claims, or may be learned by the practice of the disclosed concepts as set forth herein.

The present disclosure describes methods and arrangements for automatically modifying a video sequence to present a video ringtone. The method comprises inputting a first video sequence characterized by a sequence of images and inputting at least one audio signal. Both the video sequence and audio signal are retrieved based on an association with a caller. When a call is received from the caller, a second video sequence is output comprising the images that make up the first video sequence but having a modified playback sequence or frame rate. The second video sequence is generated by analyzing the audio signal for selected characteristics and modifying the first video sequence in response to the analysis of the audio signal. In some embodiments the second video sequence is derived based on real time analysis of the audio signal when the call is received.

In some embodiments the video sequence and audio signal that is associated with the caller are one of a plurality of video sequences or audio signals that are associated with a caller. In these embodiments one video sequence or audio signal can be chosen be software carrying out the method. In some embodiments the choosing can be random.

In some embodiments the video sequence or audio signal associated with a caller is also associated with similarity data. The similarity data identifies other video sequences or audio signals that are similar to the video sequence or audio signal associated with the caller. In these embodiments the method comprises selecting one of the similar video sequences or audio files from the video sequences or audio signals identified by the similarity data.

A system for generating video ringtones is also described. The system comprises a communications interface for receiving an incoming call from a contact. A processor can retrieve video and/or audio media files associated with the contact from a memory. The system further comprises an audio processor for receiving an audio file and analyzing the audio file for selected characteristics, and a video processor for receiving a video file comprising a sequence of images and outputting a new video file based on the analysis of the audio file. In some embodiments the processor for retrieving video and/or audio media files, the audio processor, and the video processor are combined into one processor.

The communications interface can be configured to receive voice over IP calls or configured to receive calls over a mobile telephone network. Further, the memory can contain a database of contacts and video and/or audio files to be received by the video and/or audio processors, respectively, when the communications interface receives a call from the contact.

A device for generating and playing a video ringtone is also disclosed, for example a mobile phone or smart phone. The device comprises a communications interface configured to send and receive communications over a mobile telephone network and a processor for demodulating communications received from the mobile telephone network and executing a software program for generating a video ringtone comprising analyzing an audio signal for selected characteristics and based on the analysis of the audio signal outputting a modified version of a video signal mixed with the audio signal. The device further comprises a speaker for receiving the audio signal output by the processor and outputting an audible signal, and a display for receiving and displaying the modified version of the video signal.

In some embodiments the display is also an input device such as a touch screen configured to receive touch inputs.

A method for generating and playing a video ringtone on a mobile telephone is also disclosed. The method comprises outputting a modified version of video signal in response to an incoming telephone call, the video signal being modified from its original form in response to an analysis of an audio signal for the presence of a selected characteristic.

In some embodiments the video signal is modified by freezing a frame or skipping frames or increasing the frame rate when the selected characteristic is detected in the audio signal.

Different audio characteristics can also be selected to be analyzed. For example the selected characteristic can be beat detection, or amplitude or frequency, as non-limiting examples.

BRIEF DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

DETAILED DESCRIPTION

Various embodiments of the disclosed methods and arrangements are discussed in detail below. While specific implementations are discussed, it should be understood that this is done for illustration purposes only. A person skilled in the relevant art will recognize that other components, configurations, and steps may be used without parting from the spirit and scope of the disclosure.

Figure 1:
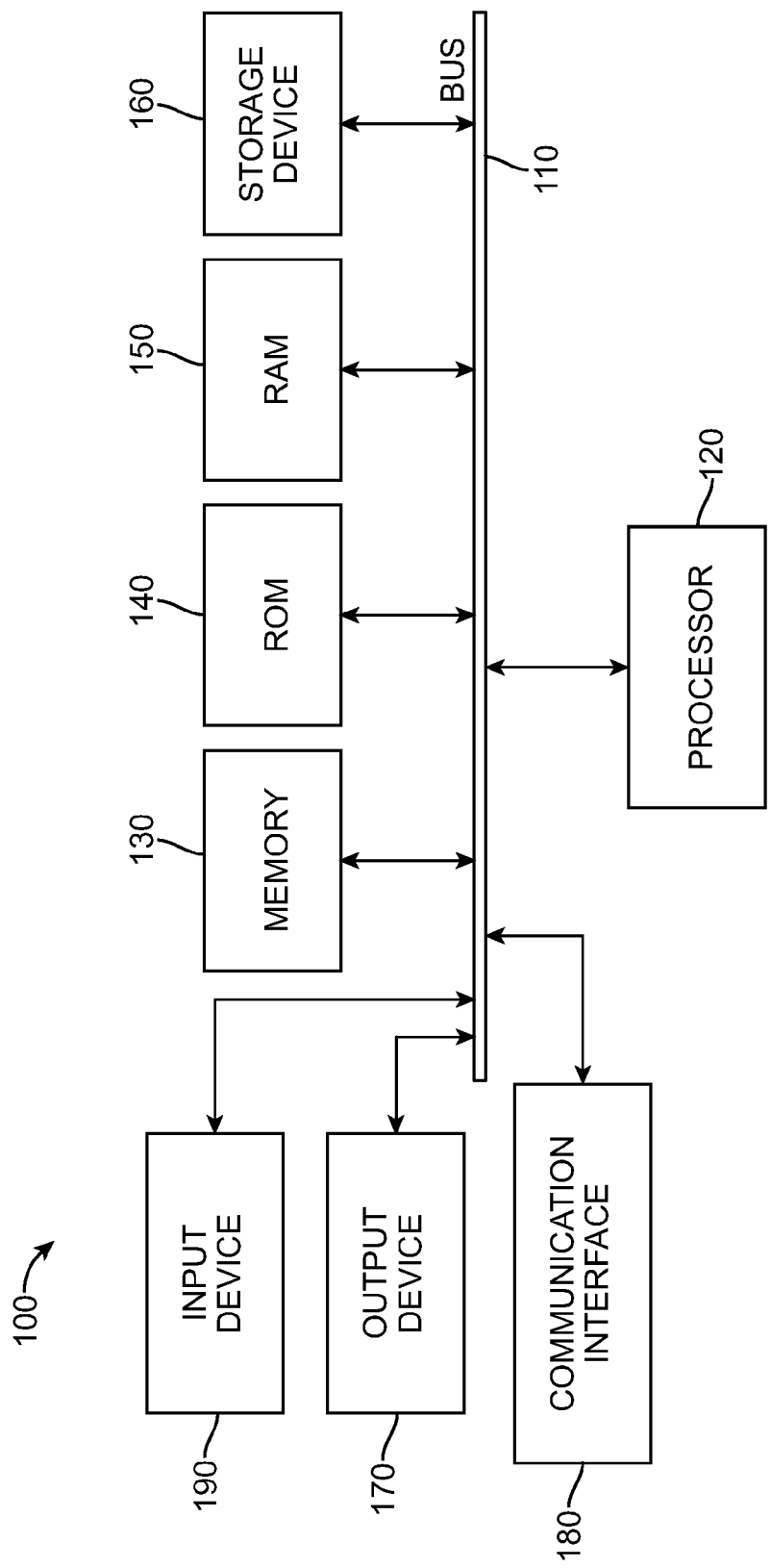
FIG. 1 illustrates an example computing device.

With reference to FIG. 1, a mobile computing device 100 is shown, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the system may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated.

Although the exemplary environment described herein employs a hard disk, it should be appreciated by those skilled in the art that other types of computer readable media which can store data that is accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. For example, video output or audio output devices which can be connected to or can include displays or speakers are common. Additionally, the video output and audio output devices can also include specialized processors for enhanced performance of these specialized functions. In some instances, multimodal systems enable a user to provide multiple types of input to communicate with the computing device 100. The communication interface 180 generally governs and manages the user input and system output. There is no restriction on the disclosed methods and devices operating on any particular hardware arrangement and therefore the basic features may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

The present system and method is particularly useful to help visualize audio segments with non associated video segments on a mobile computing device such as a pda, mobile phone, or smart phone. Individual tracks can be visualized to help illustrate the behavior of a musical instrument, a voice, a sound effect, or other characteristic of an audio segment. Multiple images can be shown simultaneously to separate, similar to a graphic equalizer, the complexity and dynamics of an audio segment. In another embodiment, video images may be layered with each layer containing a separate object.

Each layer may be individually controlled by the system so that different objects are graphically manipulated by different discrete media signals.

In some embodiments, the technology alters a single media signal or a combination of two or more media components into a modified presentation. The system analyzes a second media file and samples a characteristic of the second media file. For example, the second media file may be an audio file that is analyzed for any sounds that exceed a pre-set decibel threshold. In this example, a derivative file would store all times when the decibel threshold has been exceeded, as well as the amount by which the decibel levels were exceeded. If the second media file is a stream, i.e., real time, instead of a file, the derivative file would simply be a single value resulting from a real time analysis occurring at the sampled frequency.

An output media file is then formed based upon the first media signal and the analysis of the second media signal (i.e., the derivative file). That is, the derivative file is used to modify the output file. Additionally, the derivative file can be used to control an external device containing the first media signal. Examples of this device are a direct disk recorder (DDR), such as TIVO, and a DVD player. Finally, the second media file and the output media file are played together. Specifically, when the derivative file so indicates, the system rearranges the playback sequence of frames of the first media file. In one embodiment, the output signal is a modified media presentation having multiple media components.

Figure 2:
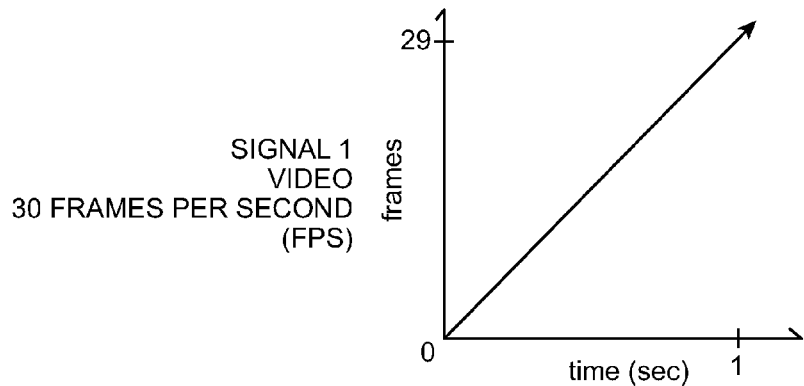
FIG. 2 illustrates a graph plotting source video against time.
Figure 3:
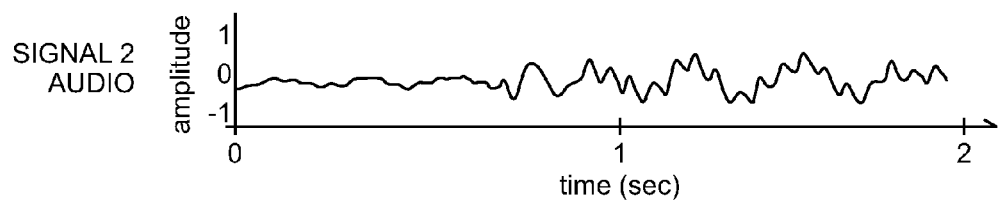
FIG. 3 illustrates a graph plotting source audio against time.
Figure 4:
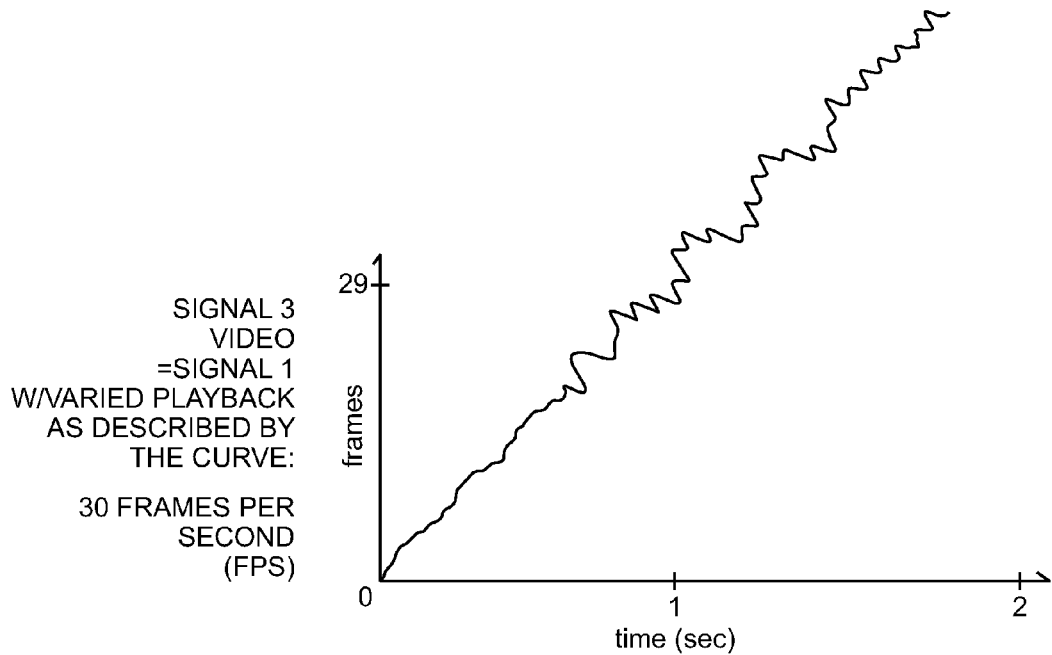
FIG. 4 illustrates a graph plotting output video against time.

An example is now provided with reference to FIGS. 2, 3, and 4 in which a sequence of frames in a video signal is altered based upon a detected amplitude of an audio signal. FIG. 2 shows a standard source video playback as a linear sequence of frames over time. FIG. 3 shows an amplitude of an audio signal as it varies with time. As shown in FIG. 4, the output signal is created from a non-linear reassembly of frames of the source video so that each frame correlates the amplitude of the audio with the future/past frames of the source video.

In an audio and video media signal embodiment, the video signal may include moving objects appearing to move in a non-linear manner in sync with a media, which can be the audio file. For example the movement of the objects in the video can appear to move to the beat of the audio track.

Normally, audio and video files are played in a specific sequence that replicates a recorded source subject, which may be a musical instrument performance or a movement of objects. The sequence of sounds replicates music and the sequence of pictures shows a visual representation of moving figures. Electronic audio files have a preset sampling rate at which specific sounds are sequentially emitted by an audio file player. Similarly, video files also have a preset frame rate at which a specific sequence of video frames are displayed by a media player. Because the audio sample rate and video frame rate may be fairly high, e.g., 160 kbs/second or higher and 30 frames/second, respectively, the human ears and eyes cannot distinguish the breaks between the tones and picture frames.

As an example, the media signal may be a drum sound that defines the beat of the song of an audio file. The inventive system can define the drum sound as the characteristic and sample this characteristic while playing the audio file normally. When the audio and video tracks are played together, the inventive system will automatically alter the sequence of the video file based upon the characteristic of the audio signal. Specifically, the video frame that would normally be displayed at the time of the characteristic (i.e., the beat) is not displayed and an alternate substitute video frame is displayed in its place. In addition, each and every frame could be reordered.

In other embodiments, any other type of media signal characteristic may be used to trigger the non-linear playback of a media signal. For example, because a video signal may be completely independent of an audio signal, the picture and sound files used by the system can be associated or completely disassociated. An example of associated audio and video signals is a musical performance featuring audio and video recordings of the musical performance. An example of disassociated audio and video files is a song and unrelated video footage of a sporting event. The system does not rely upon synchronizing markers in both the audio and video and is therefore compatible with any media signal, such as an audio file and a video file, as long as one of the files has a characteristic off which the system can trigger.

In some embodiments, a substitute frame is a frame that is close in sequence to the frame that would normally be displayed. For example, the system may display a video frame that is a few frames ahead of or behind the frame that would normally be displayed. This substitution of an out of sequence frame creates an effect where objects appear to be moving normally in a linear manner and then when the audio signal characteristic is detected, a non-sequential video frame or frames are displayed between the sequential frames. The non-sequential frames may be ahead of or behind the normally next sequential frame. If the non-sequential frame is ahead of the normal sequence, the video will appear to jump forward at the moment of the audio signal characteristic. Similarly, if the non-sequential frame is behind the normal sequence frame, the video will appear to jump backwards.

In yet another embodiment, the frame or frames displayed when the audio signal characteristic is detected may be displayed multiple times creating a temporary freezing of motion. When the audio characteristic has passed, the video returns to its normal linear playback until the next discrete audio signal is detected. The effect is a pulsation in the normally linear motion of the video that is synchronized with the audio signal characteristic.

Figure 5:
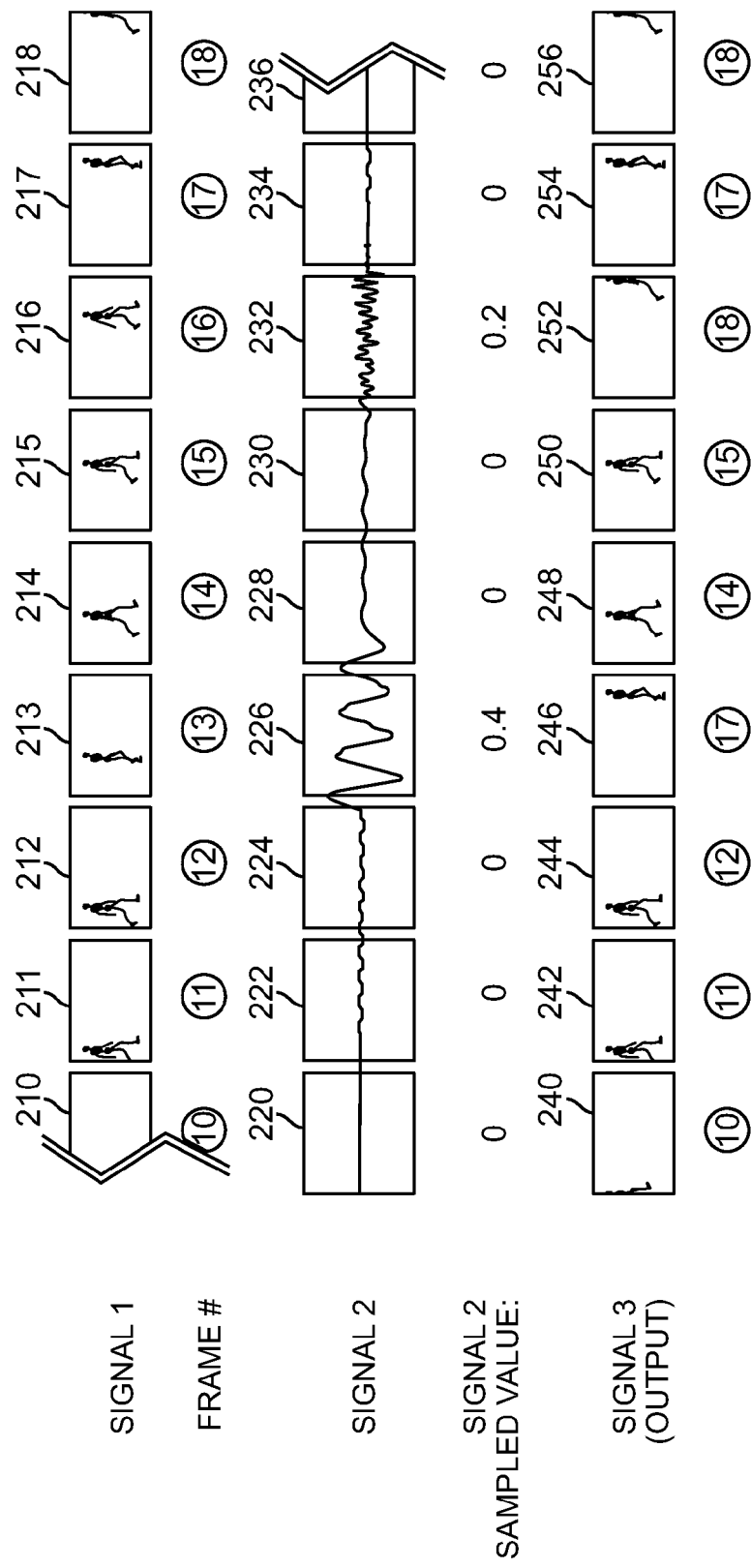
FIG. 5 shows exemplary video frame substitution based upon an audio signal.

An embodiment will now be described with reference to FIG. 5. A first signal 1, which is a video signal in this example, includes multiple frames. In FIG. 5, frames 211-218 are shown with corresponding frame numbers 11-18 (Frame 210 is only partially shown). A second signal 2 is an audio signal in this example. A characteristic of the audio signal 2, e.g., an amplitude, may be sampled. In FIG. 5, the first three sampling periods 220, 222, 224 the audio signal has an amplitude of 0. Thus, because no characteristic is detected, an output signal 3 is the same as the input signal 1. In other words, frame numbers 10, 11, and 12 are displayed at frames 240, 242, 244. At the time of the fourth sampling 226, an amplitude of 0.4 is detected. Thus, a substitute frame 246 (frame number 17) is displayed instead of the normally displayed frame 213 of the video signal 1. In other words, the output signal 3 displays frame numbers 10, 11, 12 and 17, in this order. Display of frame 217 is ahead of the normal sequence and thus, it will appear that the character has jumped ahead of where he would be expected to be.

At the fifth and sixth sampling periods 228, 230 the amplitude has returned to 0. Thus, the next output frames 248, 250 will again correspond to the video signal 1 at those times (i.e., frame numbers 14 and 15 are displayed). At the time of the seventh sampling period 232, an amplitude of 0.2 is detected. Thus, a substitute frame 252 is displayed instead of the normally displayed frame number 16 of the video signal 1. In other words, the output signal 3 displays frame numbers 10, 11, 12, 17, 14, 15, and 18 in this order. Display of frame 218 is not in the normal sequence and thus, it will appear that the character has again jumped ahead of where he would be expected to be. At the eighth and ninth sampling periods 234, 236 the amplitude has returned to 0. Thus, the next output frames 254, 256 will again correspond to the video signal 1 at those times.

Various effect modifications can be made to the described system. For example, the magnitude of the jump in the nonsequential video frame can be controlled by the user of the system. This offset can be dynamic and can be controlled to grow, shrink, oscillate, decay, delay, drift and sustain.

In an alternative embodiment, a single media signal may be used. In this embodiment, the system detects characteristics in the single media signal. The system may alter the output signal of the single media signal based upon the detected characteristics in the same media. For example in a video signal, any of the video effects may be applied to the video media upon the detection of a characteristic in the same video signal. Thus, the system may utilize a single media source to produce an altered output media signal.

In another embodiment, a video frame from a video source other than the second video signal may be the substituted frame(s) displayed when the audio characteristic is detected. In this embodiment, the second video file may be any other type of visual data including but not limited to: a 2-D file, 3-D data, and a live video feed. When the other video source is an animation file, the animation file may be controlled by the system so that the graphical display is altered when an audio characteristic is detected.

Because 2-D and 3-D computer graphics programs continuously display a composite image rather than a series of sequential frames, the inventive system will operate in a different manner when applied to such a program. For example, the motion of each displayed object may be individually controlled. Thus, the control of individual components may correspond to different characteristics. In an embodiment, a first object may be altered by a first characteristic and a second object may be altered by a second characteristic. For example, the first object may appear to bounce in response to the first characteristic and the second object may be enlarged in response to the second characteristic. Any number of visual effects may be applied to the 2-D or 3-D objects including movement, appearance, camera angle, shape, etc.

In another embodiment, the visual display may be a layered composite of visual frames. Each of the frame layers may contain a separate object and each layer may be individually manipulated in response to detecting of a characteristic. By varying only some of the frames of the composite, only objects illustrated in the layers are visually altered. For example, the first layer may include a background of mountains, a second layer may include trees and a lake, a third layer may include an airplane and the fourth layer may include a car. The mountain layer may be altered by a bass audio signal and the trees and lake layer may be altered by a mid frequency audio signal. The airplane layer maybe altered by a high frequency audio signal and the car layer may be altered by a discrete audio signature. The visual effect would show individual objects appearing to be independently altered by different characteristics.

In yet another embodiment, the frame rate can be altered, so that the display rate is higher or lower than the normal 30 frames/second. An offset calculation determined from signal 2 (described below) can be used to vary the playback rate. When a characteristic is detected, the system may temporarily accelerate the playback speed to 150 frames/second. The accelerated frames may be the normal sequential video frames, substitute frames or a visual file from another source or multiple other sources. The visual effect of displaying multiple frames at a faster rate would be acceleration, because the velocity of objects displayed increases. Conversely, if the frame rate is slowed, the visual effect would be a deceleration of moving objects. Of course, this frame rate effect can be applied to a single region visual display, a layered visual display or a multiple region visual display.

In another embodiment, multiple frames can be displayed in the time allotted for a single frame. Similarly, partial frames or blended frames may be inserted as substitute frames in a sequence of video frames.

One preferred embodiment of the technology is implemented as a set of software instructions on a computer. In this manifestation, the technology analyzes an audio signal that may be either analog or digital. Exemplary audio formats include stereo, mono, and multiple track signals, such as MP3, Quicktime, soundedit, MIDI, IMA, WAV, AIFF, Sound designer II, sun .au, or any format that may be developed in the future. Sound can be live, pre-recorded, or transmitted through airwaves or dedicated lines, such as the internet, a LAN or a WAN. The audio signal can contain multiple tracks, and the technology can discern individual (split) tracks (e.g.,—a drum track residing in a multi-track composition or score). The technology can accept signals from microphones, audio tapes (e.g., DAT and cassette), video tapes with sound tracks, CD, DVD, MIDI devices, mini disc or any future sound technologies.

The characteristic being detected can also be located in a signal created by a user. The user created signal could be employed when the actual audio signal does not provide the intended effect. That is, the user created signal can be used to achieve the intended effect. In this case, the user can select or alter specific characteristics of an audio track, for example its tempo, tone, beat, pitch, duration, carrier frequency, scale or volume. The user can also adjust the amplitudes of specific sound frequencies and can shift the pitch of the audio. In addition, the user can generate a tone (by specifying a frequency, amplitude and shape) and can insert the tone at any point in time. Such a user created signal can be recorded or can be live. An alternative user-created signal can include a duplicate of an existing audio track, the duplicate being subject to a user selected audio filtration. In this case, the original unmodified audio track and a modified track can both exist. After the user created signal has been created, it can be mixed with another audio track, e.g., the unmodified track. Alternatively, the user created audio signal is not played back or encoded into the final audio signal; rather, its data is merely used to generate time based video effects.

When the first component is a picture, it can include still images, a film or video. The image can be received by the technology in analog or digital format and can be live, broadcast, or transmitted. The picture signal can be, for example, YUV, YC, RGB, component, composite or IEEE 1394. The signal could be digital video stored on a local or remote computer. The video can also reside on a pre-recorded medium, such as a DVD, VCD, TIVO, DDR, MiniDV, laserdisc, digibeta, d1, d3 or any medium or apparatus that records images.

In an alternative embodiment, the system may analyze a video file to create an output audio file, in which the video file plays normally (sequentially) but the audio file is modified when certain characteristics are detected. The system may then play the video in a normal sequential manner and when the video characteristics are detected, the audio signal is altered. The audio signal modification can include: volume, tempo, frequency, sequence, distortion, tone or any other audio effect. The effect is to view a normal video file while the audio file is periodically distorted based upon the discrete video signal.

One implementation of the technology re-sequences motion picture frames based upon a secondary media signal. This re-sequencing can be conducted in real time, utilizing live or pre-recorded audio or live or pre-recorded video. Playback can occur in real time, and/or can be stored for later playback.

The system is particularly useful in conjunction with live media. In such a case, the media signals processed by the system may include live and/or recorded audio and live and/or recorded video. By inputting the live media data, the system can process the media data to incorporate the substitute component or a media effect by utilizing previously recorded substitute data when a characteristic is detected. Visual effects that can be implemented during a detection of the characteristic can include: varying the camera angle, color, rotation, zoom, pixelation, etc. Alternatively, if multiple cameras are recording the same live performance, the signals received from the different cameras can act as the substitute media signals and data from a second, third, fourth, etc. media source can be inserted when the characteristic is detected. The inventive processing of live media can be configured to output live audio with recorded video, live video with recorded audio, or live video with live audio. Of course any other combination would also be within the purview of the present technology.

Two generalized equations that describe the re-sequencing embodiment when utilizing two media signals are shown below.

$$O(i) = O_{max} F(S_2(i)) \quad \text{Offset calculation} \tag{1}$$

$$S_3(i) = S_1(O(i)+i) \quad \text{Output media} \tag{2}$$

$S_1(i)$=Media Signal 1 $0 \leq i \leq (n_1-1)$
$S_2(i)$=Media Signal 2 $0 \leq i \leq (n_2-1)$
$S_3(i)$=Output signal $0 \leq i \leq (n_1-1)$
$F(i)$=Filter Function Real Number
$O(i)$=offset at time i $0 < |O(i)| < O_{max}$
$O_{max}$=maximum offset (set by user)

$S_1$ and $S_2$ represent independent media signals that are used by the algorithm to produce an output signal $S_3$. As discussed, the media signals can be virtually any type of media. In the following description, $S_1$ represents a video signal and $S_2$ represents an audio signal. The "i" represents the sequential indicator. The filter function F can be any linear or non-linear equation that produces a real number. $O_{max}$ is the maximum offset and can be any number that is set by the user.

Equation (1) is the offset calculation. The offset calculation solves the offset based upon the filter function of $S_2(i)$ and has a value when a user designated characteristic is detected in $S_2(i)$. If a characteristic is not detected the filter function does not produce an output and $F(S_2(i))=O$. Consequently, $O(i)=O_{max} F(S_2(i))=0$. If a characteristic is detected by the filter function, the filter function generates a real number that is multiplied by $O_{max}$ to produce a value for $O_i$. In a preferred embodiment, the O(i) value is an integer.

Equation (2) solves the output media $S_3(i)$. If a characteristic is not detected $O(i)=0$ and the output media signal is the same as the corresponding media signal 1, $S_3(i)=S_1(0+i)=S_1(i)$. If a characteristic is detected, O(i) has a value, which may be positive or negative. The O(i) value is added to i to produce an offset value that indicates a frame ahead of or behind the sequential marker "i". Thus, during playback the output media will be the same as media signal 1 until a designated characteristic is detected in media signal 2. When the characteristic is detected, the filter function will produce a value and the output media will be offset from media signal 1. The output media may be output alone or synchronously with media signal 2 or any other media signal.

An example of a common manifestation of the technology is now described. In this example, the technology is implemented as a set of software instructions on a computer and two media signals, one audio ($S_2$) and one video ($S_1$), are stored on the hard drive of a computer. The two media signals (i.e., the video and the sound) are combined and displayed as a new media composition having a sequence of frames, each containing digital data describing, for example, the audio or visual content of the frame. When the composition is played, the frames are output at a composition frame rate. The composition includes the source audio track ($S_2$) and an output video track ($S_3$).

Figure 6:
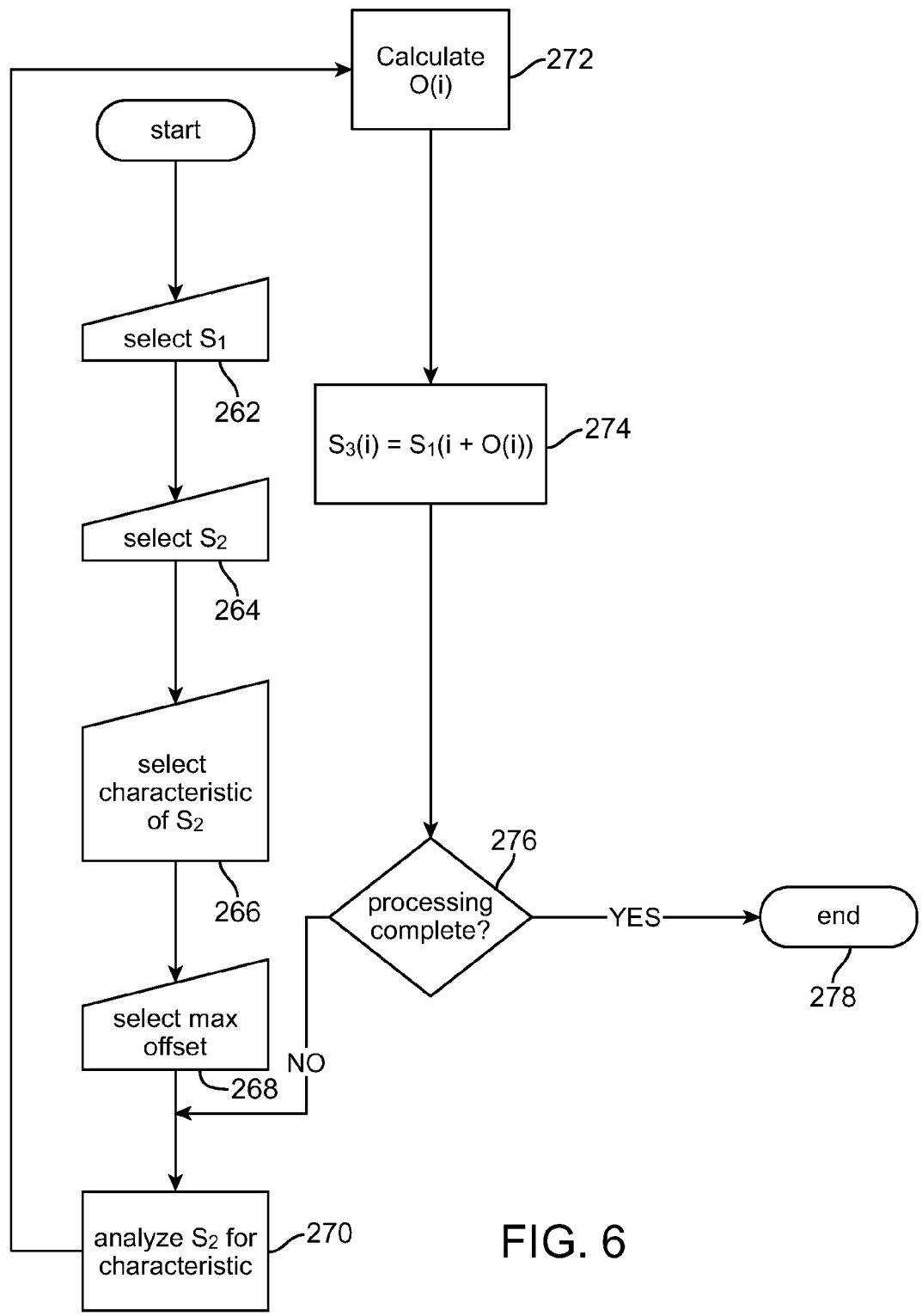
FIG. 6 is a flow chart showing exemplary processing to determine an output stream.

Referring to FIG. 6, the user, with an input device such as a mouse, keyboard or touch sensitive display, selects the video source ($S_1$) and the audio source ($S_2$), at steps 262 and 264, respectively, and places them on a time line. Of course, more than two sources can be selected and processed but for the sake of simplicity the example only uses two signals.

The user also selects a characteristic of the audio signal, at step 266. If no characteristic is selected, default settings for audio processing are used. An example of an audio characteristic is a frequency range level, such as 50-100 hz. The audio characteristic can be sampled in a direct temporal relationship to the frame rate.

At step 268, the user enters a value for the maximum offset. This variable determines the maximum range from the current frame the technology will use to select a substitute frame. In other words, this value will determine the maximum offset between the source frame and the composition frame to be displayed. Although this variable is described as a fixed value, this number can also be variable. Specifically, the maximum offset can be a function of any input including a characteristic of the media signal. In other embodiments, the maximum offset can be turned off, disabling the inventive media effects system in the event that normal playback is desired.

At step 270, the filtration function occurs. That is, the audio source ($S_2$) is analyzed for the designated characteristic. The filtering may occur at a user selected sampling frequency. The sampling frequency defaults to the frame rate of the source picture component ($S_1$): for NTSC television this is approximately 30 times a second.

Based upon the filtering function, a data set is determined. More specifically, at intervals defined by the sampling frequency, the audio characteristic is sampled and normalized. The normalization occurs so that the substitute frame will not be more than the user selected maximum offset.

In the technology's real time embodiment, step 270 is executed in parallel with steps 272-274. At step 272, the offset O(i) is calculated based upon equation (1). Subsequently, the output signal is calculated based upon equation (2). After step 274, it is determined whether processing should continue at step 276. If so, the process returns to step 270 and repeats. If the processing is determined to be completed, the processing ends at step 278.

In an example, a new media composition at 30 frames per second is created. The new media composition includes two media signals. The first media source signal ($S_1$) is a series of 300 images on a hard drive on a computer. The native playback rate of the motion picture sequence is 30 frames per second. The set $S_1(i)$ contains each frame of the series, $S_1(1)$ being the first frame and $S_1(300)$ being the last frame.

The second media source signal ($S_2$) is an audio track 10 seconds long. Played from the beginning, the track contains 3 seconds of silence, a 60 hz tone with 100% amplitude (level), lasting $\frac{1}{30}^{th}$ of a second, 3 seconds of silence, a 60 hz tone with 50% amplitude lasting $\frac{1}{30}^{th}$ of a second, and 3 and $\frac{28}{30}^{th}$ seconds of silence. $S_2(i)$ contains a set of 300 values.

In this example after the signals are selected at steps 262 and 264, at step 266 the user selects bass tones having a frequency range of 50-70 hz as the audio characteristic. The default 30 frames per second is used for the composition frame rate. At step 268, the user selects the maximum offset to be 60 frames.

At step 270 the filtering function processes the 300 members of $S_2(i)$ by sampling the audio characteristic. In this example, the audio characteristic is not detected when i=1 through 90. Thus, $F(S_2(1))$ through $F(S_2(90))=0$. At i=91, $F(S_2(91))=100$, thus normalized $F(S_2(91))=1$. At i=92-182, the audio characteristic is not detected and $F(S_2(92))$ through $F(S_2(182))$ are 0. At i=183, $F(S_2(i))=60$, thus normalized $F(S_2(183))=0.6$. At i=184 through 300, $F(S_2(i))=0$ and thus $F(S_2(184))$ through $F(S_2(300))$ are 0.

Although the values are described as being normalized between 0 and 1, it is also possible to use a threshold or non-linear function to determine the $F(S_2(i))$ values. In a threshold embodiment, the equations may be $F(S_2(i))=0$ if the detected characteristic has a value<50 and $F(S_2(i))=1$ if the detected characteristic has a value$\geq$50. Thus, if the detected characteristic=60 then $F(S_2(i))=1$. Similarly, any other linear or non-linear formula may be used to define $F(S_2(i))$ as a function of the detected characteristic.

The output media and offset equations (i.e., equations (1) and (2)) are then solved. As described above, it is preferable to use integers, thus, the INTEGER function is employed. At i=1 through 90, $S_3(i)=S_1(\text{INTEGER}(0*60+i))=S_1(i)$. At i=91, $S_3(91)=S_1(\text{INTEGER}(1*60+91))=S_1(151)$. At i=92 through 182, $S_3(i)=S_1(i)$. At i=183, $S_3(183)=S_1(0.6*60+183))=S_1(219)$.

The new composition sequence, C(i), is created. It includes 300 images played sequentially. C(i) contain the same frames as $S_1(i)$, with the exception that C(91) would play corresponding frame S(151) and C(183) would contain $S_1(219)$.

Table 1 indicates the values of the variables described in the example above.

TABLE 1

| i | Characteristic value | F(S(i)) | $O_{max}$ | O(i) | C(i) |
|---|---|---|---|---|---|
| 1-90 | 0 | 0 | 60 | 1-90 | PS(i) |
| 91 | 100 | 1 | 60 | 151 | PS(151) |
| 92-182 | 0 | 0 | 60 | 92-182 | PS(i) |
| 183 | 60 | .6 | 60 | 219 | PS(219) |
| 184-300 | 0 | 0 | 60 | 184-300 | PS(i) |

Thus, the sequence of frames in the new media composition is: $S(1)$-$S_1(90)$, $S_1(151)$, $S1(92)$-$S_1(182)$, $S_1(219)$, $S_1(184)$-$S_1(300)$. Note that $S_1(151)$ and $S_1(219)$ are displayed twice and frames $S_1(91)$ and $S_1(183)$ are not displayed at all.

The methods described above for mixing an audio and video signal or creating a new video sequence from a first video sequence based on analysis of an audio signal can additionally be used to create video ringtones on a portable computing device such as, but not limited to, a mobile phone or smart phone.

In such embodiments a portable computing device can create the output video sequence or multimedia file as described in the embodiments above. One or both the input video and input audio file can be associated with a caller. Using the methods described above, each time a call is received from the same calling party a modified version of the input video file can be viewed.

In some embodiments the video sequence is associated with a contact identified in the memory of the portable computing device. Each time a call is received from the contact the video sequence can be arranged based on the analysis of an audio signal. The audio signal can be chosen randomly from a library of available songs or also associated with the calling party. In this way different output sequences of the video file can be output when receiving multiple calls from the calling party. Likewise, even if the same video and audio signal is used every time a call is received from the same calling party, different output sequences can still be achieved by varying the parameters that control the analysis of the audio signal and the parameters that control the actions to be taken based on the analysis of the audio signal.

The video and audio files can be downloaded onto the device or recorded directly onto the device. For example, video and audio files can be available for download from an online store such as the ITUNES Store from Apple Inc, Cupertino, Calif. Video and audio files can also be downloaded directly from some other source on the internet straight to the device. In some embodiments, the video and audio files are downloaded from a personal computer. For example, songs purchased from an online store can be stored on a personal computer and can be uploaded or downloaded onto the device via a direct connection such as when connecting a smart phone such as the IPHONE (Apple Inc., Cupertino, Calif.) to a personal computer running the media management and playing software ITUNES (Apple Inc., Cupertino, Calif.). In some embodiments the media files can be recorded directly onto the device using the device's video recording and audio recording capabilities.

In some embodiments a video file having a sequence of images is associated with a contact. The video file can be any video included compressed or uncompressed formats or even live video stored in RAM. The video file can also be a sequence of still images from a series of individual files that are collectively associated with the contact. When a call is received from the contact, the video file can be accessed and a new video file can be output based on the analysis of a second input signal using the techniques discussed above. In preferred embodiments the second input signal can be an audio signal from an audio file. Using this method, different video ringtones can be output each time a call is received from the contact.

In some embodiments the audio signal can be chosen randomly from a media library stored on the portable computing device. In some embodiments the audio signal can also be associated with a contact and the parameters used in the analysis of the audio file can be varied. In some embodiments the audio is associated with a contact, but the video is not causing the same audio ringtone, but a randomly selected video can be modified.

In some embodiments the video or audio that is associated with a contact can be a seed song or video. In such embodiments, a list of videos and/or audio that is similar to the seed audio or video can be maintained and the video and/or audio that is used to generate the video ringtone can be selected from that list. One example of such similarity data is GENIUS data provided by APPLE INC, Cupertino, Calif.

Additionally, and consistent with the description above, the system is not limited to modifying video. Audio or any other signal can be the first signal that is modified to create the output signal based on analysis of a second signal. Also characteristics within the first signal can serve as the second signal to result in the output of the third signal. However, in preferred embodiments, the first signal is a video signal and the second signal is an audio signal, and the output is a dynamically mixed audiovisual ringtone consisting of modified version of the video mixed with the second signal.

As discussed above, one or more media files can be associated with a caller. This can be achieved by a database associating a contact and one or more media files to be played when a call is received from the contact.

Figure 7:
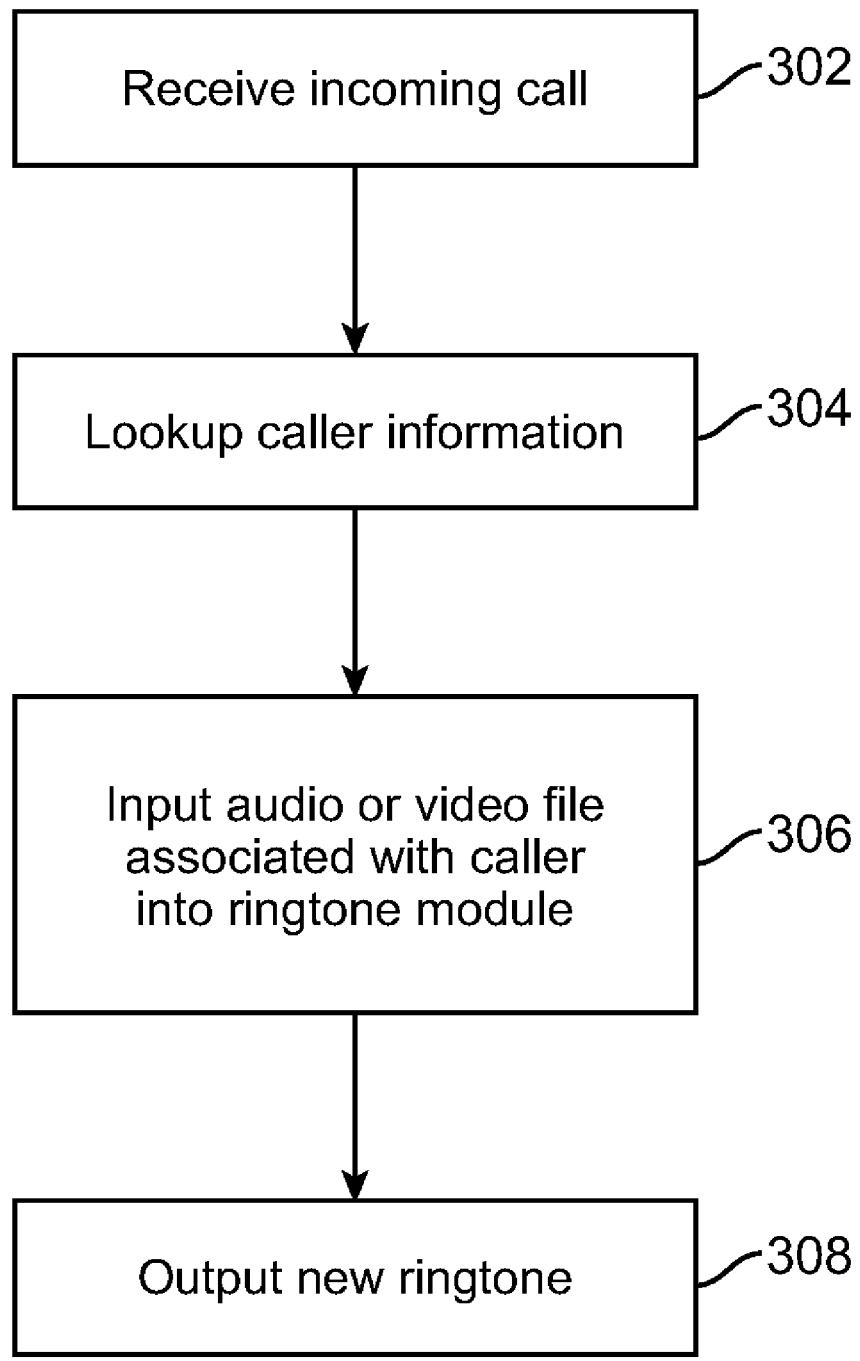
FIG. 7 illustrates a method embodiment for generating a ringtone in response to an incoming call.

FIG. 7 illustrates how an incoming call is processed. The portable computing device receives and incoming call 302. When an incoming call is received, the network can provide information about the calling party. In some cases the network can provide only the telephone number or network address of the calling party, but in other cases the network can also provide the name of the calling party. Using this information, the portable computing device can lookup additional information 304 about the calling party in the portable computing device's memory. For example, if the network only provides the telephone number or network address of the calling party, the portable computing device can perform a lookup operation using the information to identify the name of the calling party. In another example, the portable computing device can lookup information about how the device should react to an incoming call from the calling party, which includes which media (audio and/or video) should be played.

Once the portable computing device determines which media should be played in response to the incoming call, it can retrieve the associated files and input the files into the ringtone module 306 for processing and a new ringtone is output 308 to notify the user of the portable computing device of the incoming call.

Figure 8:
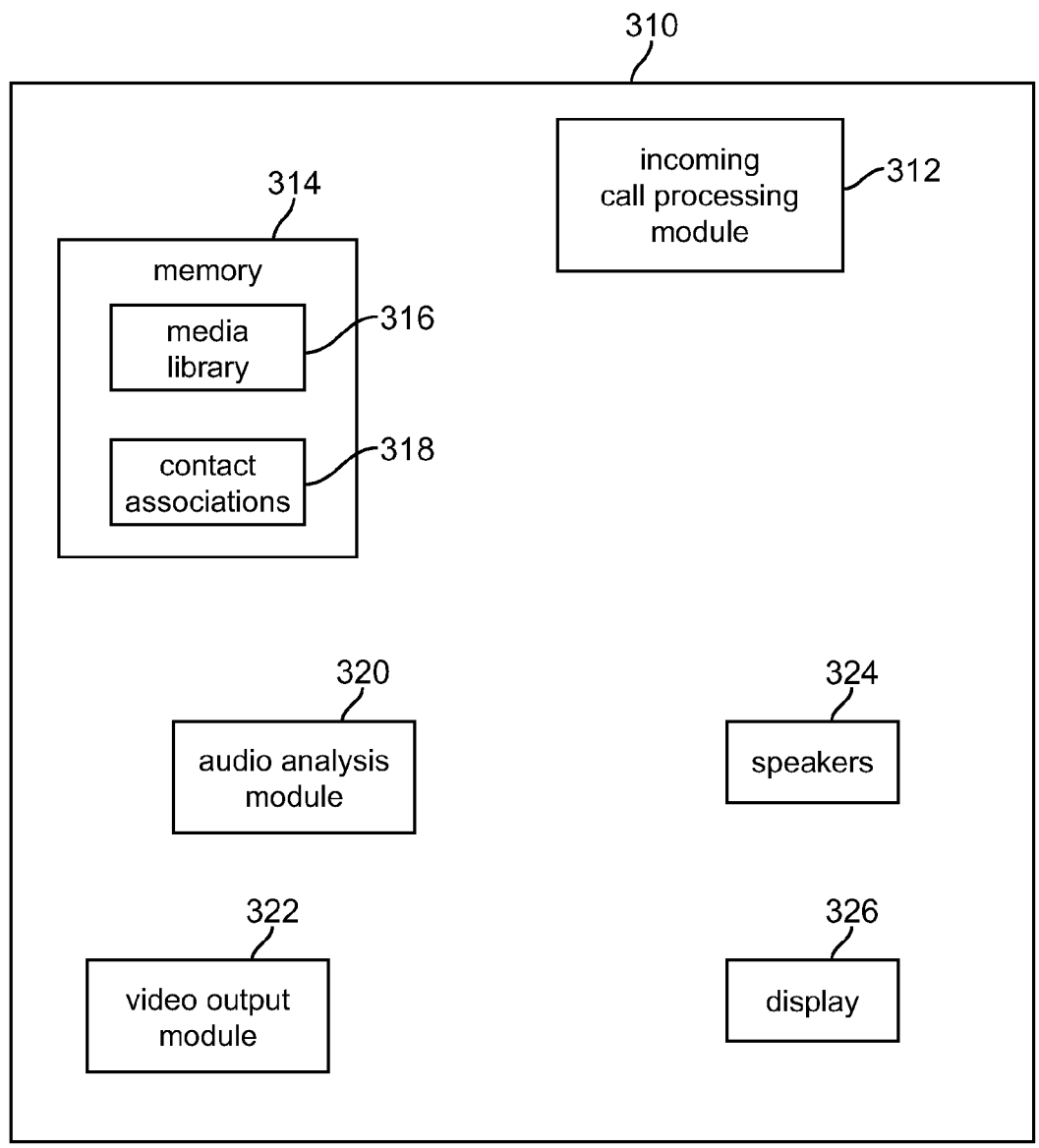
FIG. 8 illustrates a mobile phone embodiment.

FIG. 8 illustrates a functional diagram of a portable computing device 310. The device 310 has an incoming call processing module 312 for receiving incoming calls and processing information about the calling party. Incoming call processing module 312 can also look up information in a memory 314 having a database or table of contact associations 318. Incoming call processing module 312 can retrieve from the data containing contact associations information such as the name or nickname of the calling party and which media is associated with the calling party. The media associated with the calling party can be stored in a media library 316 also contained within memory 314. The media associated with the calling party can be input into an audio analysis module 320 and video output module 322. The audio analysis module can analyze the audio for characteristics of interest as described above. The video output module 322 receives the original video media and based on the analysis of the audio from the audio analysis module 320, the video output module 322 can resequence or otherwise modify the video media and output the video to display 326. The audio can be simultaneously played back via speakers 324.

While FIG. 8 illustrates the media library 316 and contact associations 318 as part of the same memory, it should be appreciated that they may be part of one or more memories. Likewise, modules 312, 320, 322 can be performed with software or hardware and if software, they can be executed on one more processors including processors with specialized functions such as audio or video processors.

In some embodiments the method of creating and modifying video ringtones as discussed above can be employed on computing devices accepting telephones calls over an internet connection. For example, a VOIP service that may allow calls to be received by a personal computer or a telephone connected to the internet.

In some embodiments a user can vary the characteristics for which the system analyzes the second signal in both type and value. For example, the user can select to analyze the second signal for amplitude and later select to analyze for beat detection. In some embodiments the system can randomly choose which characteristics it will analyze in the second signal.

Likewise, in some embodiments the user can choose the types of modifications made to the first signal to result in the third signal. For example the user can select to advance frames at a faster or slower rate, or to skip frames, or to freeze frame in response to the analysis of the second signal to result in the third signal. In some embodiments the system can choose how it will modify the first signal to result in the third signal.

While throughout the above description the technology has been described as pertaining to video ringtones for use on a portable computing device, for example a mobile telephone, it is fully contemplated herein to be able to carry out the embodiments described herein on any device capable of receiving incoming communications. Accordingly, portable computing device as it is mentioned above should be considered as no more than an embodiment of the presently described system and method.

Similarly, while the above description discusses rearranging a video signal or sequence of images in a video, the technology described herein is able to rearrange and mix other signals. For example, audio signals can be rearranged or video can be mixed with other video, etc.

Embodiments within the scope of the present technology may also include computer-readable media for carrying or having computer-executable instructions or data structures stored thereon. Such computer-readable media can be any available media that can be accessed by a general purpose or special purpose computer. By way of example, and not limitation, such tangible computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, modules, and data structures that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those of skill in the art will appreciate that other embodiments of the technology may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Communication at various stages of the described system can be performed through a local area network, a token ring network, the Internet, a corporate intranet, 802.11 series wireless signals, fiber-optic network, radio or microwave transmission, satellite, cellular etc. Although the underlying communication technology may change, the fundamental principles described herein are still applicable.

The various embodiments described above are provided by way of illustration only and should not be construed to limit the technology. Those skilled in the art will readily recognize various modifications and changes that may be made to the present technology without following the example embodiments and applications illustrated and described herein, and without departing from the true spirit and scope of the present disclosure.

The invention claimed is:

1. A processor implemented method for automatically modifying a video sequence for presenting a video-ringtone, the method comprising:
    inputting a first video sequence comprising a sequence of images;
    associating the first video sequence with a caller;
    associating an audio signal with the caller;
    generating a second video sequence by analyzing the audio signal for selected characteristics and by modifying the first video sequence in response to the analysis of the audio signal, the second video sequence comprising the sequence of images of the first video sequence but having a modified frame rate; and
    outputting the second video sequence when a call is received from the caller.

2. The method of claim 1, wherein the analyzing of the audio signal is conducted in real time when the call is received.

3. The method of claim 1, wherein the method is implemented by a mobile telephone processor.

4. The method of claim 1, wherein the first video sequence is one of a plurality of video sequences associated with the caller.

5. The method of claim 1, wherein associating the audio signal with the caller comprises:
    identifying a plurality of audio signals that are similar to a seed audio signal associated with the caller, the seed audio signal being associated with similarity data configured to identify the plurality of audio signals; and
    selecting the audio signal from the plurality of audio signals when the call is received from the caller.

6. The method of claim 1, wherein a plurality of audio signals are associated with the caller and the audio signal is selected from the plurality of audio signals when the call is received from the caller.

7. The method of claim 1, wherein outputting the second video sequence further comprises modifying the playback sequence of the sequence of images of the first video sequence.

8. A non-transitory computer readable medium storing computer executable instructions for implementing a method on a device, the method comprising:
    inputting a first video sequence characterized by a sequence of images, the first video sequence being associated with a caller, when a call is received from the caller,
    outputting a second video sequence comprising the images that make up the first video sequence but having a modified frame rate by analyzing an audio signal for selected characteristics and modifying the first video sequence in response to the analysis of the audio signal.

9. The non-transitory computer readable medium of claim 8, wherein the analyzing of the audio signal is conducted in real time when the call is received.

10. The non-transitory computer readable medium of claim 8, wherein a processor by which the method is implemented is part of a mobile telephone.

11. The non-transitory computer readable medium of claim 8, wherein a plurality of video sequences are associated with the caller and the first video sequence is selected from the plurality of video sequences when the call is received from the caller.

12. The non-transitory computer readable medium of claim 8, the method further comprising:
    identifying a plurality of audio signals based on similarity data associated with a seed audio signal;
    selecting the audio signal from the plurality of audio signals when the call is received from the caller.

13. The non-transitory computer readable medium of claim 8, wherein the audio signal is selected from one of a plurality of audio signals all associated with the caller by software executed on the processor when the call is received from the caller.

14. The non-transitory computer readable medium of claim 8, wherein outputting the second video sequence further comprises modifying the playback sequence of the sequence of images of the first video sequence.

15. A system comprising:
    a communications interface configured to receive an incoming call from a contact;
    a processor configured to retrieve a video file and an audio media file from a memory, wherein one or more of the video file and audio file are associated with a contact;
    an audio processor configured to receive the audio file and analyze the audio file for selected characteristics; and
    a video processor configured to receive the video file comprising a sequence of images and outputting a new video file comprising the sequence of images but having a modified frame rate that is derived from the analysis of the audio file.

16. The system of claim 15, wherein the communications interface is configured to receive voice over IP calls.

17. The system of claim 15, wherein the communications interface is configured to receive calls over a mobile telephone network.

18. The system of claim 15, wherein the processor for retrieving the video file and the audio media file, the audio processor, and the video processor are a single processor.

19. The system of claim 15, wherein the new video file further comprises a different playback sequence than the video file.

20. A device for generating and playing a video ringtone comprising:
    a communications interface configured to send and receive communications over a mobile telephone network;

a processor configured to execute a software program for generating the video ringtone by analyzing an audio signal for selected characteristics and based on the analysis of the audio signal, outputting the video ringtone, the video ringtone comprising a modified version of a video signal mixed with the audio signal, the modified version of the video signal having a different playback rate than the video signal;

a speaker configured to receive the audio signal output by the processor and outputting an audible signal; and a display configured to receive and display the modified version of the video signal.

21. The device of claim 20, wherein the device is a smart phone.

22. The device of claim 20, wherein the display is configured to receive touch inputs.

23. The device of claim 20 further comprising a memory configured to store a database of contacts and video files associated with the contacts to be modified by the software program.

24. The device of claim 20 further comprising a memory configured to store a database of contacts and audio files associated with the contacts to be analyzed by the software program.

25. The device of claim 20, wherein the modified version of the video signal further has a different playback sequence than the video signal.

26. A method for generating and playing a video ringtone on a mobile telephone comprising:

outputting a modified version of a video signal in response to an incoming telephone call, the video signal being modified from its original form by adjusting the playback rate in response to an analysis of an audio signal for the presence of a selected characteristic.

27. The method of claim 26, wherein the video signal is modified by freezing a frame when the selected characteristic is detected in the audio signal.

28. The method of claim 26, wherein the video signal is modified by skipping frames when the selected characteristic is detected in the audio signal.

29. The method of claim 26, wherein the video signal is modified by increasing the frame rate when the selected characteristic is detected in the audio signal.

30. The method of claim 26, wherein the selected characteristic is a beat.

31. The method of claim 26, wherein the selected characteristic is an amplitude.

32. The method of claim 26, wherein the video signal is further modified by adjusting the playback sequence in response to the analysis of the audio signal.

* * * * *